United States Patent [19]
Ohogoshi et al.

[11] 3,893,940
[45] July 8, 1975

[54] METHOD OF MANUFACTURING SURFACE ACTIVE AGENT HAVING LOW CONTENT OF UNREACTED OIL

[75] Inventors: Toshiaki Ohogoshi; Akira Kawakami, both of Funabashi, Japan

[73] Assignee: Lion Fat & Oil Co., Ltd., Tokyo, Japan

[22] Filed: Oct. 31, 1972

[21] Appl. No.: 302,511

[30] Foreign Application Priority Data
Nov. 5, 1971 Japan................................ 46-87682

[52] U.S. Cl. ............... 252/353; 252/355; 252/550; 252/555; 252/DIG. 1; 252/DIG. 14
[51] Int. Cl............................................ B01f 17/02
[58] Field of Search................... 252/353, DIG. 1

[56] References Cited
UNITED STATES PATENTS
2,103,255  12/1937  Gohr.............................. 252/353 X
2,945,818  7/1960  Costine et al...................... 252/353

*Primary Examiner*—Richard D. Lovering
*Attorney, Agent, or Firm*—Woodhams, Blanchard and Flynn

[57] ABSTRACT

A method of manufacturing a surface active agent, which comprises: mixing one or more neutralized compounds obtained by neutralizing the sulfonate or the sulfate of $C_{12\ to\ 22}$ olefins, $C_{12\ to\ 22}$ paraffins or $C_{8\ to\ 22}$ aliphatic monohydric alcohol with polyhydric alcohol, polyoxyalkylene alkylether, polyoxyalkylene alkylphenyl ether or mixture thereof in a quantity of 0.1 to 10 times as much as the quantity of said neutralized compound(s) by weight; and then subjecting the resulting solution to stripping, thereby removing the unreacted oils contained in said neutralized compound(s).

9 Claims, No Drawings

METHOD OF MANUFACTURING SURFACE ACTIVE AGENT HAVING LOW CONTENT OF UNREACTED OIL

BACKGROUND OF THE INVENTION

*a. Field of the Invention*

The present invention relates to a method of manufacturing a surface active agent containing but little of unreacted oils.

*b. Description of the Prior Art*

In the preparation of surface active agents having sulfonic acid radical or sulfuric acid radical, such as alkylaryl sulfonate, alkyl sulfonate, a salt of higher alcohol sulfuric ester, etc., the reaction conditions at the time of manufacturing — for instance, the partial pressure of $SO_3$, reaction temperature, the excess of $SO_3$, etc. — have a marked influence upon the color tone, the percentage of the unreacted oil content and the yield of the product. In the prior art, however, it has been difficult to reduce the unreacted oil content of the product without considerably sacrificing the color quality and the yield of the product. These surface active agents are used by mixing with various articles such as emulsifying dispersant, toothpaste, cosmetics and so forth, not to speak of liquid cleanser in particular. However, when any unreacted oil remains in the surface active agent thus employed, it tends to have such bad effects as making these articles have the odors of material, odors of oxidation and other offensive odors, be unpleasant to the taste, or be irritating to the skin.

Under such circumstances, as prior means of removing said unreacted oil content from the surface active agents, there are known such processes as extraction, crystallization, steam distillation, drying, etc. Among these, the extraction process comprises the steps of adding the surface active agent, including said unreacted oil content to a specific solvent; subsequently adding to said solvent by thorough mixing therewith an extracting agent capable of selectively dissolving only the surface active agent to thereby selectively transfer said surface active agent to said extracting agent; recovering the extracting agent from the solvent by separation; and further separating the surface active agent from the thus recovered extracting agent. But, this extraction process has various disadvantages which persist up to now, for example, a lot of solvent is required, the scope of applicable solvent is limited, there is a question in respect of the extraction efficiency and the recovery of solvent, there is a risk of undesirable odors and others remaining in the product in case of insufficient separation of the extracting agent, and it is generally expensive. The crystallization process also has almost the same disadvantages as the foregoing extraction process. The steam distillation process comprising the step of heating a solution of the surface active agent having unreacted oil content or injecting steam into said solution to thereby expel said unreacted oil content selectively out of the solution, has also various disadvantages, for example, a lot of steam is required for it; there is a question in respect of efficiency; large-scale equipment is required to deal with large quantity of steam; and when the active component of the surface active agent is not suited for treating as a concentrated liquid, the quantity of steam necessary for distillation is several hundred times as much as the quantity of the unreacted oil content. Furthermore, because of the heat hysteresis under a relatively high temperature at the time of heating, there is a fear of occurrence of coloring, offensive odors, by-product, etc.

The drying process is intended to remove the unreacted oil content together with the evaporating water by means of a water-unreacted oil azeotrope. Such drying is generally effected by using a drying apparatus such as heating drum, band drying apparatus, fluid drying apparatus, spray drying apparatus and the like, and the manufacture of surface active agents mostly have been adapted to the use of the spray drying apparatus. However, when using this spray drying apparatus, there is a risk of occurrence of coloring and offensive odors due to heat hysteresis under a relative high temperature. Besides, discharge of the waste gas containing the unreacted oil and other materials as it is into the air will cause air pollution, so that a secondary treatment becomes indispensable. Application of a drying processes other than the spray drying process is attended by difficulties in recovering the unreacted oil and other materials in addition to the foregoing disadvantages.

SUMMARY OF THE INVENTION

The principal object of the present invention is to provide a method of manufacturing a surface active agent having a low content of unreacted oils.

Another object of the present invention is to provide a surface active agent free of coloring matter, offensive odors and by-products.

A further object of the present invention is to provide a method of manufacturing a surface active agent as above continuously and at a lower cost than the conventional methods.

The inventors of the present invention have energetically studied and examined the ways and means of separating unreacted oils contained in surface active agents, and as a result, they have discovered that said unreacted oils can be selectively removed through the process comprising mixing the surface active agent including the unreacted oils with a specific substance and subjecting the resulting mixture to stripping. The present invention has been accomplished on the basis of this discovery.

To be precise, the present invention relates to a method of manufacturing a surface active agent containing but little of unreacted oils, which is characterized by the steps: mixing one or more of neutralized compounds obtained by neutralizing the sulfonate or sulfate of $C_{12\ to\ 22}$ olefins, $C_{12\ to\ 22}$ paraffins or $C_{8\ to\ 22}$ aliphatic monohydric alcohols with polyhydric alcohol, polyoxyalkylene alkylether, polyoxyalkylene alkylphenyl ether or their mixtures in a quantity of 0.1 to 10 times as much as the quantity of said neutralized compound(s) by weight; and then subjecting the resulting solution to stripping to remove the unreacted oils therefrom.

DETAILED DESCRIPTION OF THE INVENTION

To give a further detailed explanation of the present invention, the foregoing neutralized compound to be employed for the present invention (or a mixture comprising one or more of the surface active agents containing the unreacted oil generally in the range of 0.2 to 10% by weight though this content admittedly varies with the kind and/or conditions of the sulfonated material) includes the neutralized compounds of the sulfonate or the sulfate of olefins having 12 to 22 carbon atoms, paraffins having 12 to 22 carbon atoms, or longchain aliphatic monohydric alcohol with alkyl radical having 8 to 22 carbon atoms, such as, for instance, an alkali metal salt and an ammonium salt of an olefin sulfonic acid, paraffin a sulfonic acid, etc. or an alkali metal salt and an ammonium salt of aliphatic monohydric alcohol sulfates and so forth. These surface active agents can be employed either individually or upon combining two or more of them. As the substance to be mixed with said neutralized compound, there are polyhydric alcohol and polyoxy ether including glycerin, ethylene glycol, polyglycol such as polyethylene glycol (with molecular weight of about 200 to 600) and polypropylene glycol (with molecular weight of about 200 to 1000), sorbitol, etc., polyoxyethylene adduct of aliphatic alcohol having eight to 20 carbon atoms (with 3 to 15 mol of ethylene oxide), polyoxyethylene adduct of alkyl phenol having eight to 16 carbon atoms (with 5 to 15 mol of ethylene oxide), and these substances can be employed either individually or upon combining two or more of them. Besides, inasmuch as these substances are generally used as the additive for liquid detergents, toothpaste, cosmetics, etc., their presence in the finally produced surface active agent for use in the emulsifying dispersant, toothpaste and cosmetics, not to speak of liquid cleanser in particular, would cause no disadvantages at all. The appropriate quantity of these polyhydric alcohols, polyoxy ethers, etc., for mixing with said neutralized compounds is in the range of about 0.1 to 10 times — preferably about 0.5 to 5 times — as much as the quantity of the latter by weight. When the quantity is less than 0.1 times as much as the quantity of the latter by weight, it is impossible to deal with the said surface active agent in the liquid phase, while any further increase of said quantity above more than 10 times as much as the quantity of the latter by weight will bring about no perceptible enhancement of the effect.

According to the present invention, a liquid mixture prepared by adding said polyhydric alcohol, polyoxy ether and the like in a quantity of about 0.1 to 10 times as much as the quantity of said neutralized compound(s) by weight to the latter — preferably said liquid mixture as heated up to a fixed temperature — is subjected to stripping, and as the apparatus for use in this stripping, the conventional evaporation apparatus, particularly a thin film-evaporator, is preferable in view of the requirement for high over all heat transfer coefficient, high evaporation efficiency, etc. The feed of said liquid mixture to the thin film-evaporation surface on this occasion is about 10 to 2,000 kg/hr — preferably about 50 to 1,000 Kg/hr per square meter of the heating surface area.

The temperature for stripping, that is, the film temperature, is desirably in the range of about 10 to 200°C — preferably about 20° to 150°C, and accordingly, the heating temperature of the jacket is desirably held at about 20° to 150°C higher — preferably about 50° to 100°C higher — than the boiling point of the liquid mixture.

The appropriate pressure for stripping is in the range of about 2 to 760 mm Hg — preferably about 50 to 350 mm Hg. Under the conditions as given above, the foregoing liquid mixture is subjected to stripping at a viscosity of less than about 10,000 centipoises — preferably in the range of 1 to 1,000 centipoises, and its residence time within the apparatus is very short.

According to the present invention, when the melting point of the desired surface active agent is relatively high or in order to make the method of the present invention further effective, it is desirable to heat said liquid mixture up to about 10° to 200°C — preferably about 20° to 150°C by the use of a conventional heat exchanger of plate type, shell-and-tube type, etc., immediately before stripping. On this occasion, a pressure about 1 Kg/cm² higher than the pressure at the boiling point of said liquid mixture is to be applied to the heat exchanger. Besides, according to the present invention, as an alternate for employment of steam at the time of stripping the liquid mixture, it will do to provide a flash chamber instead of said evaporation apparatus so as to remove the unreacted oil mixed with the heated liquid mixture by flashing. On this occasion, as to the temperature of said heated liquid mixture, the heating of the jacket, the pressure to be used, etc., practically the same conditions as in the aforementioned evaporation process can be applied.

Subsequent to the stripping, the unreacted oil which is recovered together with water by separating from the product (i.e., surface active agent), is treated by settling. In this way, the unreacted oil and water are divided into two layers. Then, the supernatant unreacted oil is removed and dehydrated by an appropriate means such as, for instance, distillation, addition of anhydrous sodium sulfate and the like, so as to serve again as the sulfonated or sulfated material for the present invention, or serve as a material for other purposes. The separated water is discharged as waste water. The surface active agent prepared by the above described method scarcely includes any reacted oil: or, if any, its content is extremely small. Besides, even if the unreacted oil possesses such properties as coloring, offensive odors, etc., due to erroneous operation or the like, it can be refined by adding a small quantity (say, several percents) of active clay to the recovered unreacted oil, heating the mixture for a few minutes at a temperature of about 100° to 120°C while agitating, and then treated by settling.

The method of the present invention is as elucidated in the foregoing, and its advantages are as follows:

1. It provides products of high quality, and makes it possible to recover the unreacted oil completely without a secondary treatment. In other words, it never damages the base of the surface active agent during manufacture, and can turn out products free of coloring, offensive odors and undesirable byproducts. Besides, it is possible to reuse the recovered unreacted oil.

2. As secondary advantages, the desired substance (surface active agent containing unreacted oil) can be dealt with in the form of a liquid at the time of manufacturing, so that such evaporation apparatuses as the thin film-evaporator are applicable, it is feasible to make the scale of the apparatus smaller, and a high yield can be expected. Although the products include polyhydric alcohols and polyoxy ethers concurrently, the presence of these substances does not interfere with the uses of the surface active agent under the present invention, as discussed in the foregoing.

As will be understood from the above description, the method according to the present invention renders it possible to manufacture a surface active agent including but a trifling quantity of unreacted oil, at a lower cost and at a higher purity than in the case of the conventional methods.

Hereunder will be given some examples, embodying the method of the present invention.

DESCRIPTION OF THE PREFERRED EMBODIMENTS

EXAMPLE 1

A liquid mixture was prepared by adding (1) 95% glycerin, (2) 60% sorbitol and (3) polyethylene glycol (No. 400) in a fixed quantity respectively to an aqueous solution of α-olefin ($C_{15\ to\ 18}$) sodium sulfonate [active ingredient, hereinafter referred to as A.I., wherein: concentration = 25% by weight, unreacted oil content = 1.75% by weight (7.0% by weight of A.I.), color (as 5% aqueous solution of A.I.) = 20 ]. This liquid mixture was subjected to stripping by employing a forced thin film-evaporation apparatus having heating a surface area of 0.1 m² under the conditions of 54 Kg/hr feeding rate, 130°C preheating temperature, 150°C heating temperature and 150 mm Hg pressure (absolute pressure) of said thin film-evaporation apparatus. The result was as shown in the following Table 1. As is evident from the showing data given in Table 1, the unreacted oil content decreased from 7% by weight (per A.I.) to about 1% by weight (per A.I.), and the color was in the range of 20 to 24, making little difference between the before and after treatment color.

served a decrease in the unreacted oil content from 3.2% by weight (per A.I.) to about 0.9% by weight (per A.I.).

Table 2

| | Quantity of polyoxyethylene adduct* of nonyl phenol (with 8 mol of ethylene oxide) applied | |
|---|---|---|
| | 1 | 2 |
| Quantity of residual unreacted oil (wt% per A.I.) | 0.9 | 0.85 |
| Color tone (absorbancy ×1000) 10% A.I. aq. soln, 10 mm cell, 420 mμ | 16 | 15 |

(Remark) *Multiple of quantity per A.I. by weight

What is claimed is:

1. A method of removing unreacted oil from a member of the group consisting of a salt of (A) a sulfate and (B) a sulfonate of an oil selected from the group consisting of (1) olefin having 12 to 22 carbon atoms, (2) paraffin having 12 to 22 carbon atoms, (3) aliphatic monohydric alcohol having eight to 22 carbon atoms, and mixtures of said salts, said salt containing an appreciable amount of unreacted oil, which comprises: mixing a material consisting essentially of an aqueous solution of said salt containing said unreacted oil, with 0.1 to 10.0 times as much, based on the weight of said salt, of a substance selected from the group consisting of (a) a polyhydric alcohol, (b) a polyoxyalkylene alkyl ether, Table 1

| | Quantity of glycerin applied* | | | Quantity of sorbitol applied* | | | Quantity of polyethylene glycol applied* | | | Comparative Example** | | |
|---|---|---|---|---|---|---|---|---|---|---|---|---|
| | 2 | 3 | 5 | 2 | 3 | 5 | 2 | 3 | 5 | 2 | 3 | 5 |
| Quantity of residual unreacted oil (wt% per A.I.) | 1.05 | 1.02 | 0.97 | 1.16 | 1.05 | 1.05 | 1.00 | 0.98 | 1.02 | | 4.53*** | |
| Color tone (absorbancy × 1000) 5% A.I. aq. soln, 10 mm cell, 420 mμ | 23 | 24 | 20 | 25 | 25 | 22 | 23 | 23 | 20 | | 55 | |
| Viscosity (centipoise) at 100°C | 1,000 | 60 | 30 | 10,000 | 3,200 (110°C) | 1,000 (110°C) | 800 | 50 | 25 | | 8,000,000 or more | |

(Remarks)
*Multiple of quantity per A.I. by weight.
**Addition of equivalent water in lieu of solvent such as glycerin.
***When water was employed, the results were identical irrespective of the quantity of water employed.

EXAMPLE 2

A liquid mixture was prepared by adding a fixed quantity of the polyoxyethylene adduct of nonyl phenol (with 8 mol of ethylene oxide) to an aqueous solution of synthetic alcohol ($C_{12\ to\ 15}$) sodium sulfate [A.I., wherein: concentration = 27% by weight, unreacted oil content = 0.87% by weight (3.2% by weight per A.I.), color (as 10% aqueous solution of A.I.) = 15]. This liquid mixture was subjected to stripping by employing the same apparatus as in Example 1 under the conditions of 60 Kg/hr feeding rate, 130°C heating temperature and 30 mm Hg pressure (absolute pressure) of the thin film-evaporation apparatus. (The preheating was excluded.) The result was as shown in the following Table 2. When using the same polyethylene glycol as in Example 1 instead of the foregoing polyoxyethylene adduct of nonyl phenol (with 8 mol of ethylene oxide), the result was almost the same. There was then ob- (c) a polyoxyalkylene alkyl phenyl ether, and (d) mixtures of (a), (b) and (c), said substance being essentially the only treating agent added to said solution, and then subjecting the resulting liquid mixture consisting essentially of said aqueous solution of said salt, said oil and said substance, to stripping to remove said unreacted oil.

2. A method as defined in claim 1, wherein the quantity of said substance mixed with said material is 1 to 5 times as much, based on the weight of said salt.

3. A method as defined in claim 1, wherein in said stripping, said resulting liquid mixture is heated to a temperature in the range of about 10° to 200°C.

4. A method as defined in claim 1, wherein in said stripping, said resulting liquid mixture is subjected to a pressure in the range of about 2 to 760 mm Hg.

5. A method as defined in claim 1, in which said salt is an ammonium or alkali metal sulfate or sulfonate of said oil.

6. A method as defined in claim 1, in which said substance is selected from the group consisting of glycerin, ethylene glycol, polyethylene glycol having a molecular weight of about 200 to 600, polypropylene glycol having a molecular weight of about 200 to 1,000, sorbitol, polyoxyethylene adducts of 3 to 15 moles of ethylene oxide to aliphatic alcohols having eight to 20 carbon atoms, polyoxyethylene adducts of 5 to 15 moles of ethylene oxide to alkylphenols having eight to 16 carbon atoms, and mixtures thereof.

7. A method as defined in claim 6, in which the amount of said substance is from 0.5 to 5 times as much, based on the weight of said salt.

8. A method according to claim 1, in which the stripping is effected by flowing a thin film of said resulting liquid mixture along a heated surface at a rate of from 10 to 2,000 kg/hr per square meter of the heated surface area, at a temperature of from 10° to 200°C and under a pressure of about 2 to 760 mm Hg absolute.

9. A method according to claim 8, in which the thin film is flowed at a rate of from 50 to 1,000 kg/hr, per square meter of the heated surface area, at a temperature of from 20° to 150°C and under a pressure of about 50 to 350 mm Hg absolute.

* * * * *